United States Patent [19]
Wiggins

[11] 4,428,715
[45] Jan. 31, 1984

[54] MULTI-STAGE CENTRIFUGAL COMPRESSOR

[75] Inventor: Jesse O. Wiggins, Peoria, Ill.
[73] Assignee: Caterpillar Tractor Co., Peoria, Ill.
[21] Appl. No.: 324,718
[22] Filed: Nov. 24, 1981

Related U.S. Application Data

[63] Continuation-in-part of Ser. No. 91,679, Jul. 2, 1979, abandoned.

[51] Int. Cl.³ .............................................. F01D 1/06
[52] U.S. Cl. ................................ 415/199.2; 415/199.6
[58] Field of Search ...................... 415/83, 143, 199.1, 415/199.2, 199.4, 199.6

[56] References Cited

U.S. PATENT DOCUMENTS 1,488,582  4/1924  Allen ...................................... 415/143
2,350,839  6/1944  Szydlowski ............................ 415/83

FOREIGN PATENT DOCUMENTS 1401438  10/1968  Fed. Rep. of Germany ........ 415/83
972751   2/1951   France ................................... 415/83

OTHER PUBLICATIONS

*Axial Flow Compressors, Fluid Mechanics and Thermodynamics*, Horlock, J. H., R. E. Krieger Publishing Co., Huntington, N.Y., 1973, pp. 73-75.

Primary Examiner—Philip R. Coe
Assistant Examiner—Frankie L. Stinson
Attorney, Agent, or Firm—John W. Grant

[57] ABSTRACT

A centrifugal air compressor (11) has an annular air flow path (14) of progressively increasing diameter and progressively diminishing cross-sectional area in which a plurality of internal compression-diffusion stages (30) are provided. The stages of progressively greater diameter are defined by rows (29) of impeller (12) blades which are alternated with rows (32) of stator blades along the air flow path (14) and each such blade row (29, 32) has a diffusion factor below about 0.55 and a de Haller number above about 0.70. The multi-staged construction combines higher isentropic efficiency with reduced size and may be used as a component of a gas turbine engine (18) or a turbocharger (57) or for other purposes requiring gas compression.

8 Claims, 14 Drawing Figures

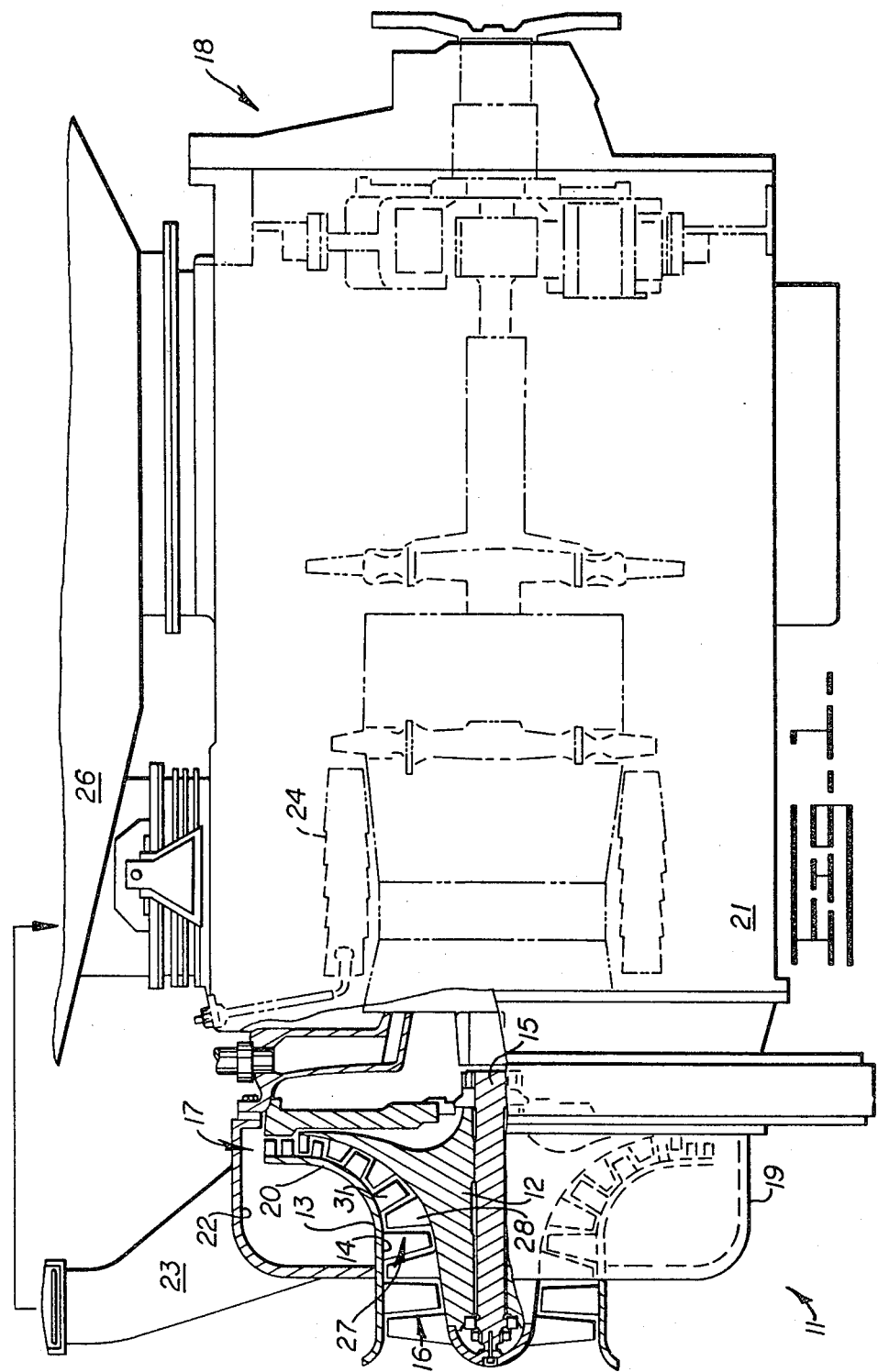

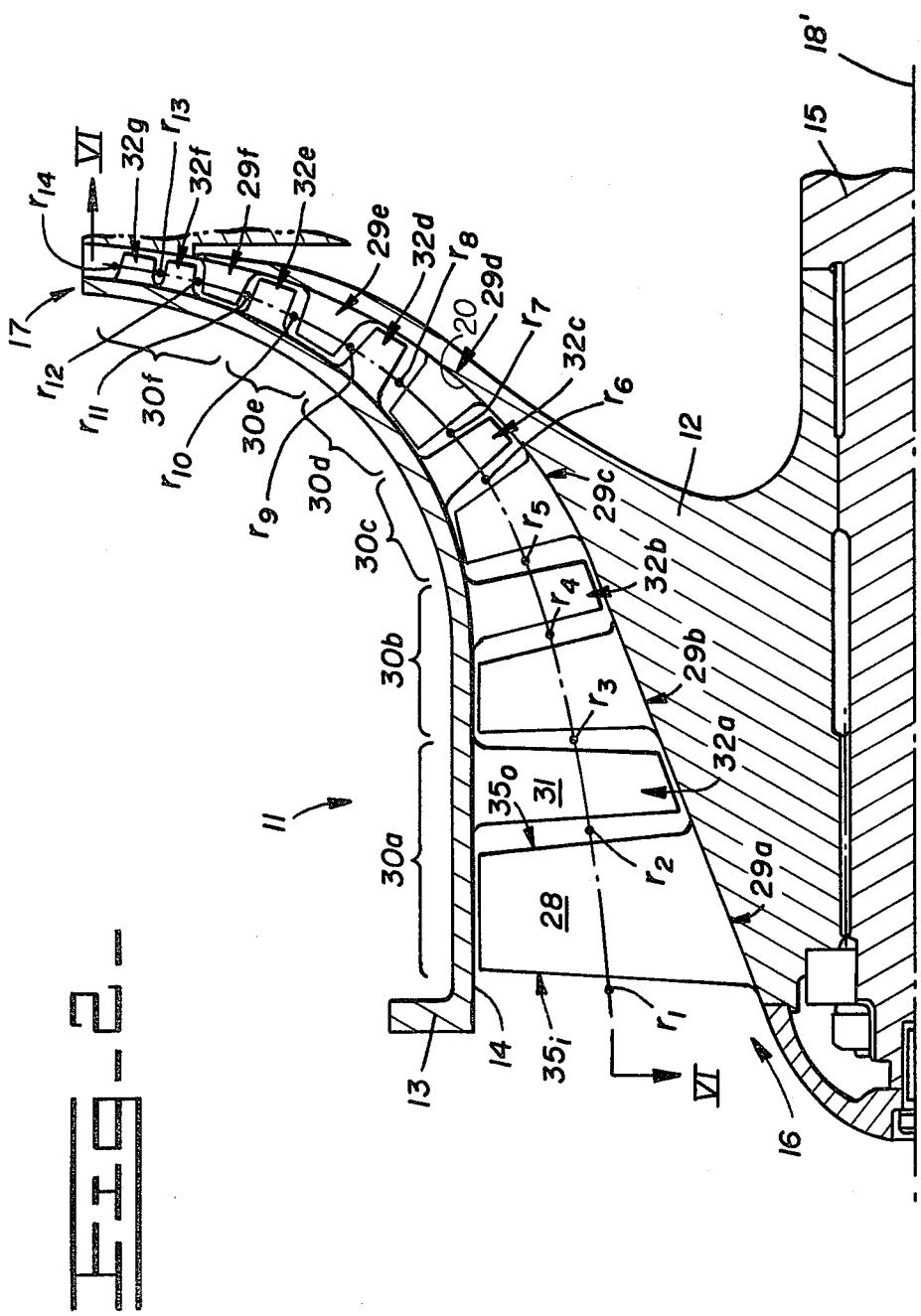

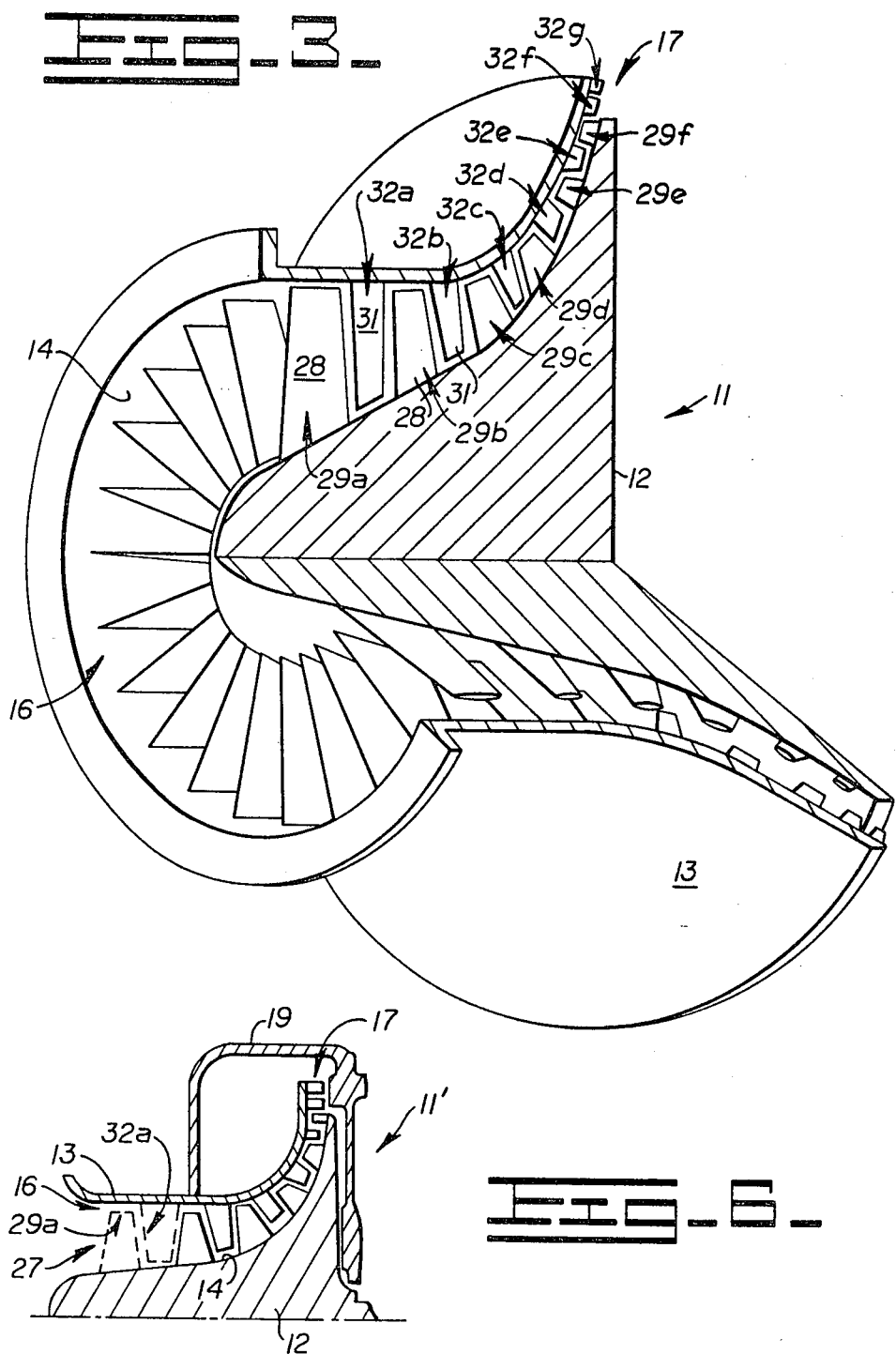

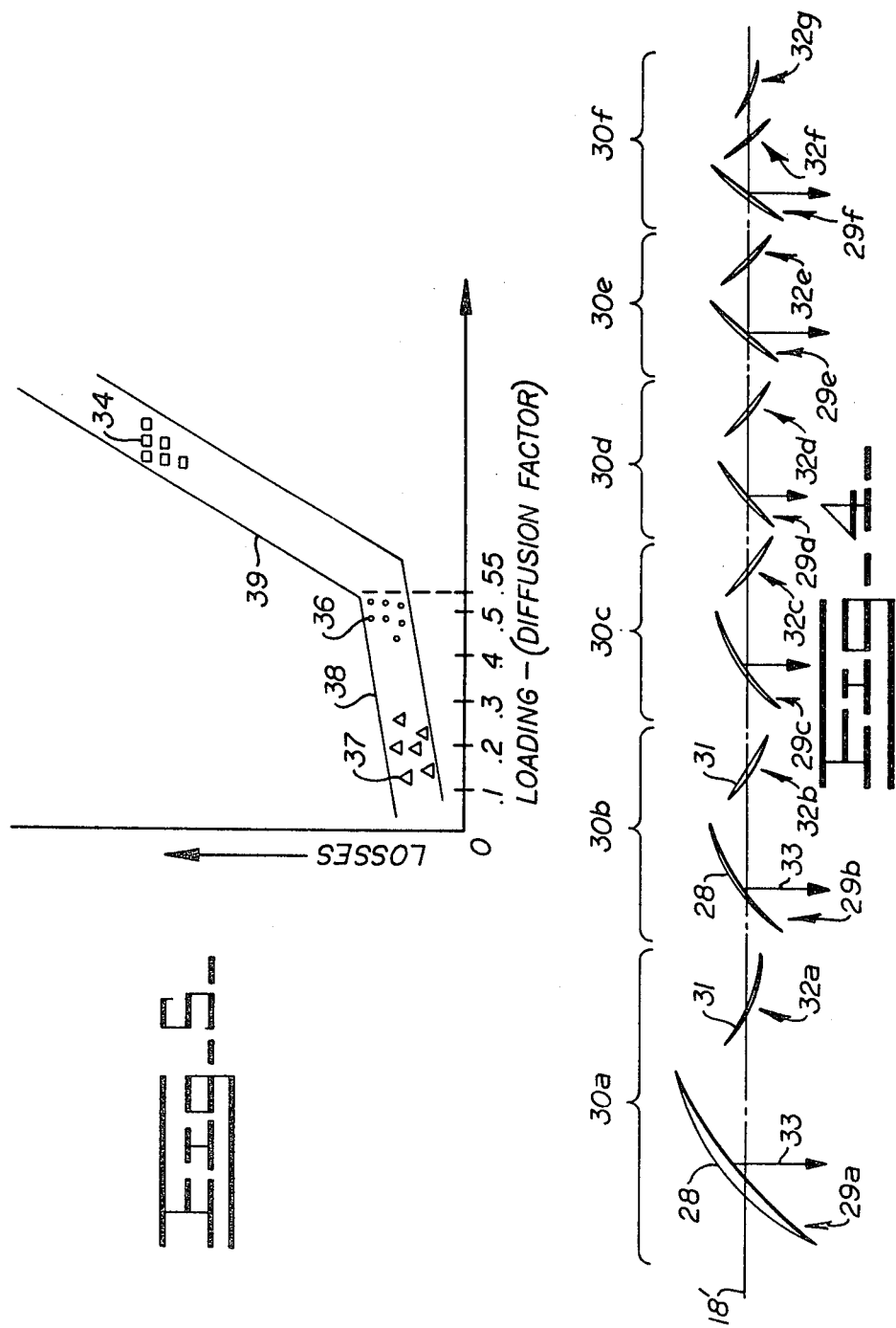

FIG_7A_
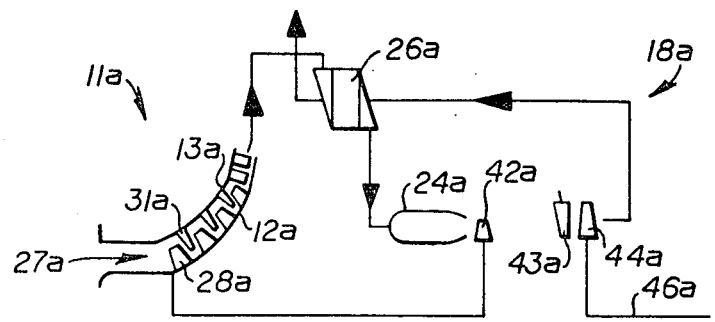
FIG_7B_
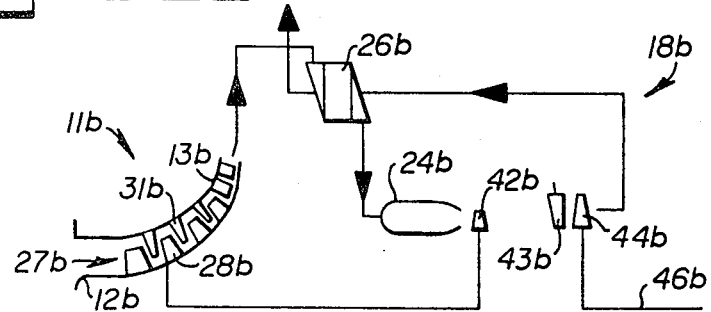
FIG_7C_
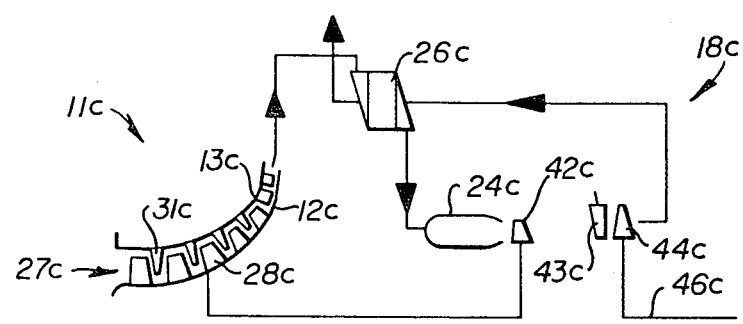

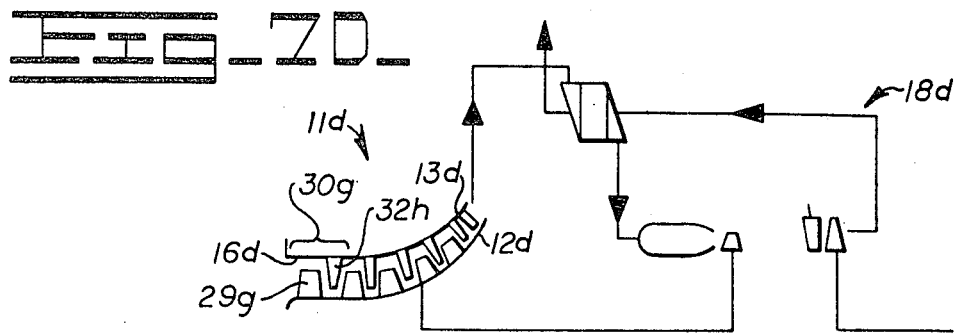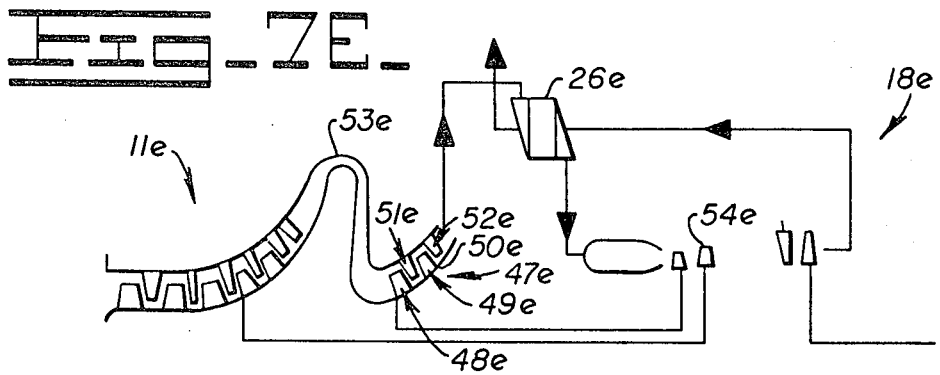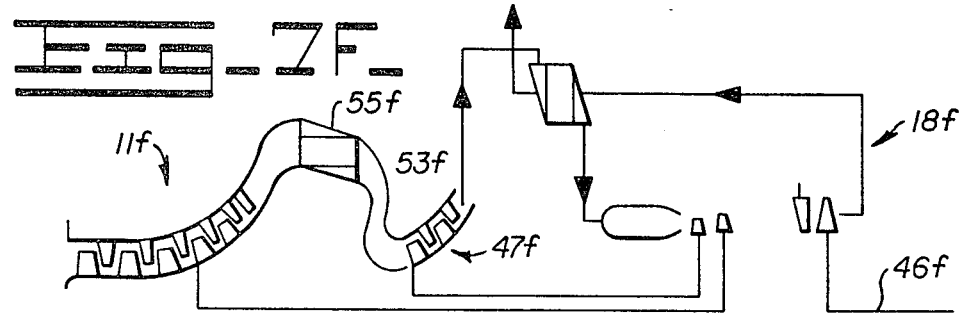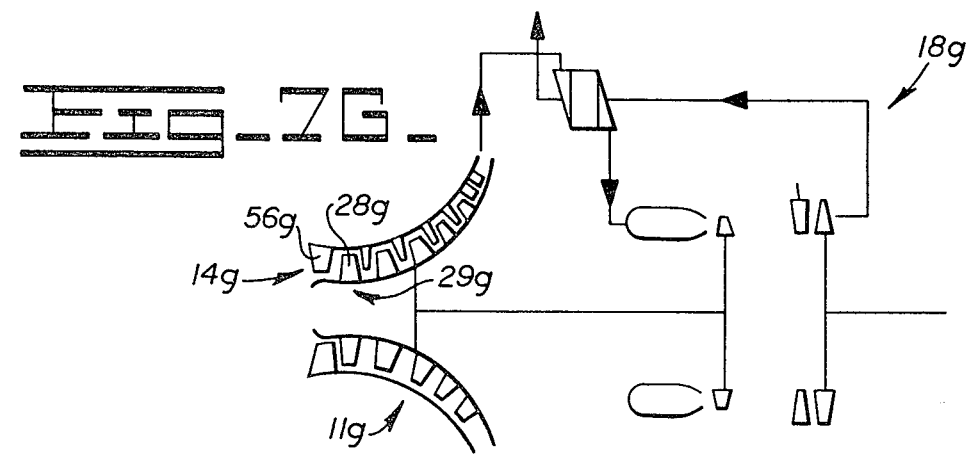

MULTI-STAGE CENTRIFUGAL COMPRESSOR

CROSS REFERENCE TO RELATED APPLICATION

This application is a continuation-in-part of copending application Ser. No. 91,679 of Jesse O. Wiggins filed July 2, 1979, and now abandoned, and entitled MULTI-STAGE CENTRIFUGAL COMPRESSOR.

DESCRIPTION

1. Technical Field

This invention relates to compressors for air or other gases and more particularly to centrifugal or radial flow compressors in which rotating blades are situated in a flow passage that increases in diameter towards an outlet end.

2. Background Art

Compressors having rotating vanes or blades may be divided into two categories on the basis of the configuration of the air flow passage. Centrifugal or radial flow compressors, which constitute the first category, have a flow passage that increases in diameter in the direction of the air flow. Axial flow compressors form the second category and have a flow passage of constant or almost constant diameter.

Centrifugal compressors are basically simpler, more compact and less costly than the axial flow form. These characteristics are highly desirable in many compressor usages such as in gas turbine engine and engine turbochargers as well as others. Heretofore it has been necessary to tolerate a relatively low isentropic efficiency in order to gain these advantages. If the compressor is an engine component, the low efficiency adversely affects the efficiency of the engine as a whole.

A single compressor stage consists of a set or blade row of revolving compressor blades followed by at least one set or blade row of diffuser blades which may be stationary or counter rotating. A sizable proportion of the energy imparted to incoming air by the revolving compressor blades is initially tangential energy of motion of the air flow. To complete the compression process the air flow must then pass through the diffuser blades which are oriented at a different angle than the compressor blades in order to convert tangential velocity energy into static pressure head.

The degree of compression accomplished in a rotary compressor is expressed by the pressure ratio which is the ratio of pressure at the outlet to that at the inlet. A high pressure ratio across a single compressor stage requires a high loading on the compressor blades, the blade loading being quantitatively expressed by the diffusion factor. Where sizable pressure ratios are to be achieved with a single stage, the diffusion factor must necessarily be high. Isentropic efficiency, which is an inverse function of the diffusion factor, is therefore necessarily low.

In the case of axial flow compressors, it has been recognized that high efficiency may be realized by providing a series of compression-diffusion stages along the flow path of constant or near constant diameter with the blade sets at each stage being configured to establish a diffusion factor below a critical limit and a de Haller number above a critical limit. The overall pressure ratio of a plural staged axial compressor of this kind is the product of the lower pressure ratios of the individual stages of the series. As each stage individually has a low pressure ratio, each stage operates at high efficiency and the efficiency of the axial compressor as a whole is also high.

The art has not heretofore recognized the applicability of highly efficient multiple staging to centrifugal compressors perhaps because of the past association with the disadvantageous length of axial compressors or because of an intuitive recognition that blade configurations and other parameters designed for a flow path of constant radius cannot be assumed to be compatible with one of expanding radius. In any case, prior centrifugal compressors are either single staged or have plural stages that do not collectively provide a desirably high efficiency. In other instances, a series of essentially separate single stage centrifugal compressors have been connected together in tandem through bulky and complex air ducting for channeling the outlet flow from one stage radially inward to the smaller diameter inlet of the next subsequent stage. This results in a lengthy, complex and costly construction such as is found in axial flow compressors.

Prior centrifugal compressors also exhibit other problems aside from an undesirably low efficiency where a high pressure ratio is to be realized. Designing for a high pressure ratio in a single staged compressor results in extremely high tangential air velocity behind the single long set of compressor blades. This in turn dictates that a bulky and heavy diffuser structure, including lengthy diffuser blades and a voluminous diffusion chamber, be provided at the outlet.

A further practical problem encountered in prior centrifugal compressors arises from the fact that different compressor usages require different pressure ratios and flow capacities. If each compressor model in a family of compressors of different pressure ratio and capacities must be manufactured with a large number of distinct parts usable only in the one particular model, the cost of manufacture of the line of compressors as a whole is increased.

The present invention is directed to overcoming one or more of the problems as set forth above.

DISCLOSURE OF THE INVENTION

In one aspect of the present invention a compressor has relatively rotatable inner and outer elements defining an annular flow path, the flow path including a substantially axially directed flow inlet end and a flow outlet end of greater diameter and a curved portion extending between the flow inlet end and the flow outlet end that becomes progressively more radially directed as it approaches the flow outlet end. A series of compression-diffusion stages are provided in the flow path, each of the stages including at least one of a series of compressor blade rows and at least one of a series of diffuser blade rows, the compressor blade rows being connected to one of the inner and outer elements and the diffuser blade rows being alternated with the compressor blade rows along the flow path and being connected to the other of the inner and outer elements.

A plurality of the compression-diffusion stages including a plurality of the compressor blade rows and a plurality of the diffuser blade rows are located in the curved portion of the flow path, each of the blade rows having a mean radius increase between the inlet side of the blade row and the outlet side of the blade row which is less than about 15%.

In another aspect of the invention, the blade rows of each of the plurality of stages have blade means for providing a calculated design point diffusion factor below about 0.55 and a de Haller number greater than about 0.70.

The invention greatly increases the efficiency of a centrifugal compressor while preserving the compactness of prior centrifugal compressors and while preserving much of the structural simplicity as well. Efficiency gains may in fact exceed those realized in axial flow compressors of similar pressure ratio and flow capacity as centrifugal effects aid the compression process. Consequently, fewer internal stages may be needed to achieve a given pressure ratio with a given energy input. As diffusion is largely accomplished internally, a large diffuser is not necessarily needed at the compressor outlet. Thus the invention may be relatively compact in the diametrical direction relative to prior centrifugal compressors. In a preferred form, the multi-staged construction also enables the manufacture of a family of centrifugal compressors of different pressure ratio and/or flow capacity without requiring a large number of different structural elements for each model. If the multi-stage centrifugal compressor is a component of a gas turbine engine, an engine turbocharger, or the like, the high efficiency of the compressor significantly reduces power losses in such apparatus as a whole.

BRIEF DESCRIPTION OF DRAWINGS

FIG. 1 is a broken out side elevation view of a first embodiment of a centrifugal compressor constituting the air intake component of a gas turbine engine.

FIG. 2 is an enlarged axial section view of a portion of the air compressor of FIG. 1.

FIG. 3 is a broken out perspective view of the impeller and stator portions of the air compressor of FIGS. 1 and 2 further illustrating blading structure within the compressor.

FIG. 4 is a view taken along curved line IV—IV of FIG. 2 illustrating the configurations and relative inclinations of the blades of successive stages within the air compressor of the preceding figures.

FIG. 5 is a graph depicting input power losses as a function of blade loading or diffusion factor in an embodiment of the present invention and in typical prior air compressors.

FIG. 6 is an axial section view of a portion of an air compressor basically similar to that of FIG. 2 but with modifications of the blading structure to vary the air flow capacity.

FIGS. 7A to 7G are diagrammatic views illustrating further modifications of the compressor of FIG. 1 which enable realization of any of a series of different pressure ratios and/or flow capacities utilizing much of the same basic structural components.

BEST MODES OF CARRYING OUT THE INVENTION

Figure 8:
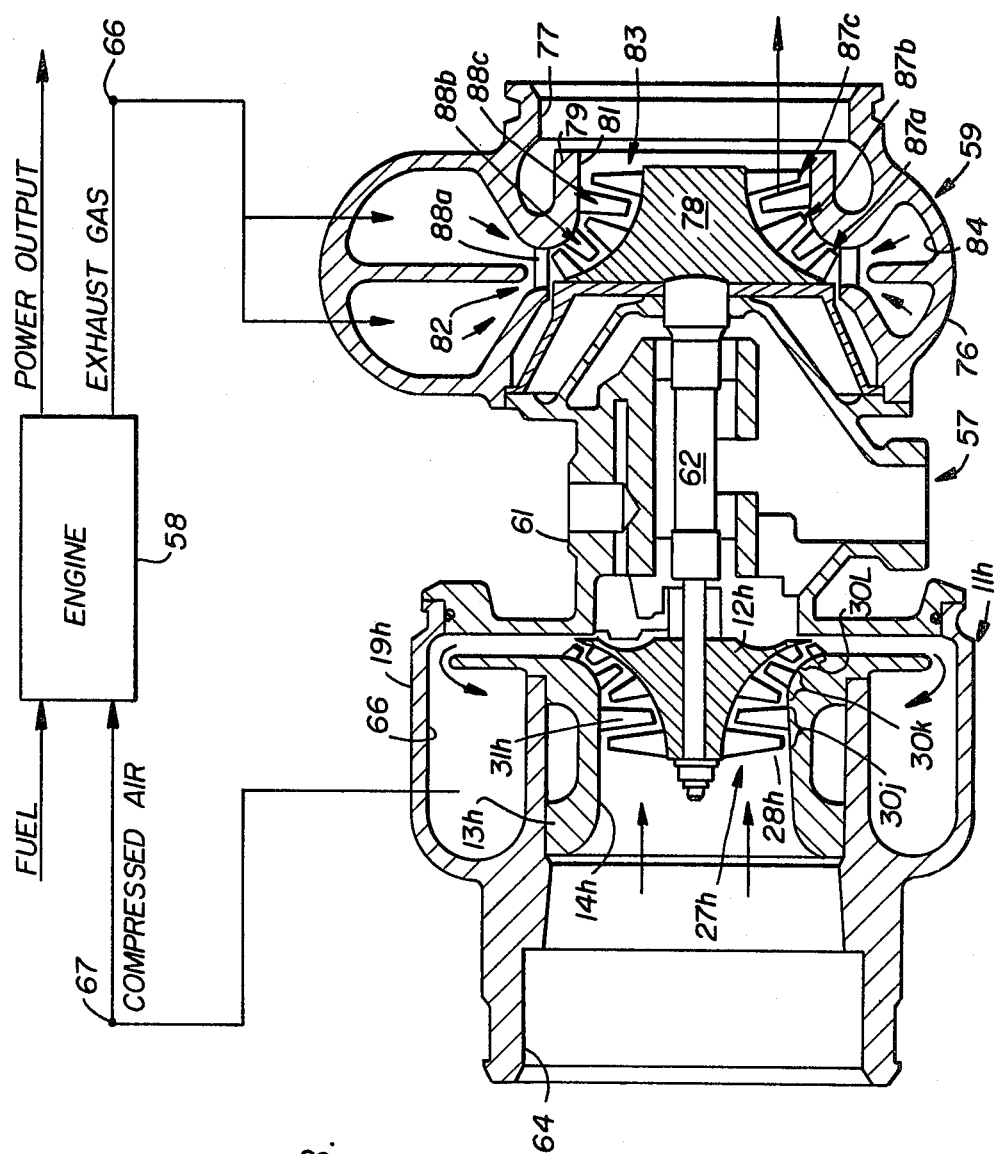
FIG. 8 is an axial section view of an engine turbocharger having a compressor section in accordance with one embodiment of the invention.

Referring initially to FIG. 1 of the drawings a radial flow or centrifugal compressor 11 has an impeller 12 disposed for rotation within an annular stator member 13 respectively constituting relatively rotatable inner and outer elements that jointly define an annular flow path 14.

Impeller 12 is of progressively increasing diameter from a substantially radially directed air inlet end 16 of the flow path 14 towards a substantially axially directed air outlet end 17. Stator member 13 has an inner diameter which also progressively increases along the flow path 14 but at a lesser rate so that the spacing of the impeller from the stator diminishes towards the outlet end 17 of the flow path. The diminishing spacing of the impeller 12 from stator member 13 along flow path 14 compensates for the progressively increasing diameter of the flow path towards the outlet end which would otherwise cause the flow path to have a progressively increasing cross-section area. The decrease in spacing also compensates for the air compression that occurs along the flow path 14 and which progressively reduces the volume occupied by unit mass of air as it travels along the path. The annular flow path 14 includes a curved portion 20 extending from the flow inlet end 16 and the flow outlet end 17. The curved portion has a progressively increasing degree of outward curvature and becomes progressively more radially directed as it approach the flow outlet end 17.

In the embodiment of the invention depicted in FIG. 1, compressor 11 constitutes the air intake component of a gas turbine engine 18 and certain structural features of this particular compressor 11 are specialized for this context. For example, the impeller 12 is supported on and driven by a forward extension of the main shaft 15' of the gas turbine engine 18 and the inner stator member 13 is secured to an outer stator member 19 which is itself secured to the main housing 21 of the gas turbine engine and supported thereby.

Aside from the air intake section defined by the compressor 11, the gas turbine engine 18 may be of a known design such as that described in prior U.S. Pat. No. 4,030,288 and therefore will not be further described except for certain components which directly coact with elements of the compressor. It should be understood that usage of a compressor embodying the invention is not limited to the context of gas turbine engines. When the invention is employed in other contexts or for other purposes, the impeller 12 may be journaled within the stator members 13 and 19 by suitable bearing structures known to the art and may be driven by any of a variety of known external motors. Similarly, the stator may be provided with appropriate support means of any of various known forms.

The inner and outer stator members 13 and 19 jointly form an annular diffusion chamber 22 which receives air from the outlet end 17 of the compressor flow path 14. In order to minimize the size of the compressor in the radial direction, outer stator member 19 is shaped to situate most of the volume of diffusion chamber 22 adjacent the smaller diameter forward portion of inner stator member 13. This is a practical configuration in that the lengthy, radially extending diffuser vanes required at the outlet end of the flow path in many conventional single stage centrifugal compressors are not necessarily required in the present invention.

Diffusion chamber 22 is communicated with a compressed air outlet tubulation 23 which in the present example supplies the compressed air to the combustor 24 of the gas turbine engine 18 through a heat exchanger module 26 which transfers heat from the exhaust of the engine to the incoming compressed air. In instances where the compressor 11 is used for purposes other than in a gas turbine engine, the outlet tubulation 23 may be replaced with a hose or other conduit means suitable for connection with the compressed air utilizing device.

Compression of air within the flow path 14 is accomplished by blading means 27 depicted on a larger scale in FIG. 2, which form a plurality of internal compression-diffusion stages 30a to 30f of low blade loading or diffusion factor within the flow path 14. A plurality of compression-diffusion stages are located in the curved portion 20 of the flow path 14 with at least one of the compression-diffusion stages being located in the substantially axially directed flow inlet end 16 of the flow path and at least one of the compression-diffusion stages being located in the substantially radially directed flow outlet end 17.

Referring now to FIGS. 2 and 3 in conjunction, a plurality of spaced apart sets or blade rows of compressor blades 28 extend radially from impeller 12 into the flow path 14, there being six such rows 29a, 29b, 29c, 29d, 29e, 29f of compressor blades, proceeding from the air inlet end 16 to the air outlet end 17, in this example. The individual compressor blades 28 of each row 29a to 29f are equiangularly spaced around the rotational axis of the impeller 12 and owing to the progressively diminishing thickness of the flow path 14, the blades of each successive row extend progressively smaller distances from the impeller.

A plurality of spaced apart stationary sets or rows of diffuser blades 31 extend into flow path 14 from the inner stator member 13, there being seven rows 32a, 32b, 32c, 32d, 32e, 32f, 32g of diffuser blades 31 in this example. The rows 32a to 32g of diffuser blades are alternated with the rows 29a to 29f of compressor blades 28 except that the two final rows of diffuser blades 32f and 32g are both behind the final row 29f of compressor blades. Individual blades 31 of each row 32a to 32g of diffuser blades are also equiangularly spaced apart with respect to the rotational axis of the compressor and the blades of each successive row 32a to 32g extend progressively shorter distances from the stator member to accommodate to the progressively diminishing thickness of the flow path 14.

Each row 29a to 29f of compressor blades in conjunction with the following row of diffuser blades 31 constitutes one of the plurality of compression-diffusion stages 30a to 30f situated in the flow path 14. Thus in the present example compressor blade row 29a and diffuser blade row 31a form a first compression-diffusion stage 30a and compressor blade row 29b in conjunction with diffuser blade row 32b form a second compression-diffusion stage 30b, there being six such stages in this example.

Referring now to FIG. 4, the individual compressor blades 28 of each row 29a to 29g are inclined relative to the rotational axis 18' of the impeller to impart an increment of flow velocity to intercepted air as the blades turn in the direction indicated by arrows 33 in the drawing. The compressor blades 28 of each successive row 29a to 29g have a progressively increasing angulation relative to axis 18' to accommodate to the progressive increase of free stream velocity which occurs along the flow path. The blades 31 of the successive rows 32a to 32g of diffuser blades have an opposite angulation relative to axis 18', which also becomes progressively greater for each successive set of diffuser blades, in order to convert tangential velocity energy imparted to air by the preceding set of compressor blades into static pressure head energy.

Thus, with reference to FIGS. 1 and 2, the compression achieved by compressor 11 as a whole is accomplished in six distinct compression-diffusion stages 30a to 30f along the flow path 14. The pressure ratio of each individual stage 30a to 30f may therefore be low relative to a conventional centrifugal compressor having a single row of long compressor blades followed by a single row of long diffuser blades, designed to accomplish the same degree of compression. Since each component stage 30a to 30f of compressor 11 operates at a low pressure ratio and therefore a high level of efficiency, the aggregate efficiency of the several stages in combination is itself high in comparison with conventional single staged devices.

In order to fully realize the gains in efficiency inherent in the multiple stage construction, each compression-diffusion stage 30a to 30f is designed to have a free stream flow velocity which is below supersonic throughout the region of blading means 27 and to have a diffusion factor below about 0.55 and a de Haller number greater than about 0.70 at each blade row. As is known in the art, the diffusion factor and the de Haller number of a single blade row may be selected, within limits, by an appropriate fixing of the shape, angulation and number of compressor blades and diffuser blades in relation to the configuration of the flow path and the rotational velocity of the compressor blades. As conventionally defined, the equation for diffusion factor applies to axial flow compressors and is not fully applicable when applied to a centrifugal compressor having blade rows of different diameters. In a centrifugal compressor such as the present invention, wherein the free stream air velocity is subsonic throughout the region of the blading as is the case in the compressors of the present invention, diffusion factor (D.F.) is more accurately defined by the expression.

$$(D.F.) = \left(1 - \frac{W_2}{W_1}\right) + \frac{r_2 W_{\theta 2} - r_1 W_{\theta 1}}{2\sigma W_1}$$

where:
W = flow velocity relative to blade row
$W_1$ = inlet flow velocity relative to blade row
$W_2$ = outlet flow velocity relative to blade row
$W_\theta$ = tangential flow velocity relative to blade row
$\sigma$ = blade row solidity (proportion of open flow space to total cross-sectional area of flow path in blade region)
$r_1$ = mean radius of blade row inlet
$r_2$ = mean radius of blade row outlet The de Haller number, which is a measure of the degree of diffusion occurring at a blade row as is understood in the art, is equal to $$\left(\frac{W_2}{W_1}\right)$$

and occurs as a component term in the above stated diffusion factor equation.

The benefit of establishing a diffusion factor below about 0.55 and a de Haller number above about 0.70 at each of the several blade rows 29, 31 may be seen by referring to FIG. 5 which is a graph depicting measured input energy losses, that is energy which does not become available as pressure energy at the outlet of the compressor, as a function of diffusion factor for three different types of rotary compressor all of which achieve the same overall pressure ratio or degree of compression. Rectangles 34 designate measured losses for a conventional single stage centrifugal compressor which necessarily must have a relatively high diffusion factor to accomplish the desired degree of compression in the single stage. Circles 36 indicate the relatively low measured losses in a conventional multiple stage axial flow compressor in which the diffusion factor for each individual stage may be much lower and therefore more efficient. Triangles 37 indicate the measured losses in a multiple stage centrifugal compressor embodying the present invention. It should be observed that the compression is accomplished in the present invention with diffusion factors at each stage which are substantially lower than those of the lengthier and more complex axial flow compressor. The reason for this greater efficiency of the present invention as indicated by triangles 37 is believed to be that centrifugal force supplements the direct effect of the blading in achieving compression. This effect does not occur in the nonradial flow path of an axial flow compressor.

The significance of a calculated design point diffusion factor value of about 0.55 as an upper limit for the individual stages of the present invention is also evident in FIG. 5. It may be seen that there is not a linear relationship between power loss and diffusion factor. Instead, as the diffusion factor is increased from a very low value, losses rise at a relatively moderate rate, indicated by lines 38, until a value of about 0.55 is reached. Thereafter losses increase much more sharply with increasing diffusion factor as indicated by lines 39. Efficiency is an inverse function of power losses and thus it may be seen that efficiency drops off relatively sharply after the diffusion factor value of about 0.55 is passed.

Aside from being drawn at a reduced scale, the blading structure including blade shapes and orientations as depicted in FIGS. 2 to 4 constitutes a construction for the blading means (27) meeting the above described criteria in one specific example of the invention which provides a 6.5 to 1 pressure ratio with six stages 30a to 30f. Changes in the number of blade rows, blades per row and blade shapes and orientations may be made within the above described diffusion factor and de Haller number constraints to accommodate to other compressors having different design point parameters.

Referring to FIG. 2 in particular, it is a characteristic of this example and other practical compressors meeting the above described criteria that a sufficient number of blade rows 29, 32 are provided to maintain the mean radius increase between the inlet side 35i and the outlet side 35o of each blade row below about 15% and greater than about 2%. For this purpose the mean radius at the inlet side 35i of each blade row 29 or 32 is defined as the distance between the rotational axis 18' and a point $r_1$ to $r_{14}$ which is midway between the stator member 12 and impeller 14 and also located midway between the particular blade row 29 or 32 and the preceding blade row 29 or 32. The point $r_1$ for the first blade row 29a, which has no preceding blade row, is fixed at the location where it would occur if there were a preceding blade row and the final mean radius point $R_{14}$ is located where it would be if there were a subsequent blade row.

The increase of mean radius across each blade row 29, 32 may be expressed by the ratio $$\frac{r_{n+1}}{r_n}$$

where the particular blade row is the nth one in the series. The ratio should not exceed 1.15 for any blade row 29, 32 in order to be within the 15% mean radius increase limit.

In the particular example of the invention depicted in FIGS. 2 to 4, the absolute values of the radii $r_1$ to $r_{14}$ and the mean radius increase ratios, $$\frac{r_{n+1}}{r_n},$$

for each blade row 29, 32 are as follows:

| radius | value (in centimeters) | blade row | $r_{n+1}/r_n$ |
|---|---|---|---|
| $r_1$ | 10.5791 | | |
| $r_2$ | 10.9845 | 29a | 1.0391 |
| $r_3$ | 11.3678 | 32a | 1.0349 |
| $r_4$ | 11.8377 | 29b | 1.0413 |
| $r_5$ | 12.5908 | 32b | 1.0636 |
| $r_6$ | 13.4366 | 29c | 1.0688 |
| $r_7$ | 14.7244 | 32c | 1.0958 |
| $r_8$ | 16.0401 | 29d | 1.0894 |
| $r_9$ | 17.8968 | 32d | 1.1158 |
| $r_{10}$ | 19.1135 | 29e | 1.0680 |
| $r_{11}$ | 21.1074 | 32e | 1.1043 |
| $r_{12}$ | 22.0142 | 29f | 1.0429 |
| $r_{13}$ | 23.8709 | 32f | 1.0843 |
| $r_{14}$ | 27.1043 | 32g | 1.1355 |

Returning to FIG. 1, the high efficiency of the compressor 11 in turn increases efficiency of the gas turbine engine 18 itself as power losses in the compressor section of the engine are reduced. As compared with a gas turbine engine utilizing an axial flow compressor configuration for the purpose of realizing somewhat comparable efficiencies, the engine 18 of this example is much more compact and the compressor section is simpler and less costly.

While the compressor 11 described above is provided with six internal compression-diffusion stages 30a to 30f, varying numbers of stages may be provided by changing the number of sets or rows of compressor blades 28 and diffuser blades 31. Moreover, the construction readily lends itself to manufacture of a family of compressors of different pressure ratio and/or flow capacities by varying only the number and disposition of the rows of blades 28 and 31 within the flow path 14 while otherwise utilizing identical components for the several compressor models. Referring to FIG. 6 for example, a compressor 11' having a lower pressure ratio but a smaller air mass flow rate and therefore a smaller driving power requirement may be produced simply by removing the first row 29a of compressor blades and the first row 32a of diffuser blades, shown in phantom in FIG. 6, while otherwise utilizing components, such as impeller 12 inner stator member 13 and outer stator member 19 identical to those of the previously described embodiment. In general, the elimination of compression-diffusion stage blading means 27 from the air inlet 16 region of the flow path 14 has an effect of reducing both air mass flow and pressure ratio while the elimination of stages of blades from the region nearest the air outlet end 17 has the predominate effect of reducing pressure ratio. Adding of stages at the inlet end increases mass flow and pressure ratio while additional stages near the outlet end predominately raise pressure ratio.

Thus while a limited number of specific blading modifications will be described with reference to FIGS. 7A to 7G and specific parameters will be given, such examples are not exhaustive of the possible modifications. In accordance with the above discussed relationships, other modifications may be made to provide other mass flows and pressure ratios.

FIGS. 7A to 7C diagrammatically illustrate how a series of compressors 11a, 11b, 11c respectively of different pressure ratio and/or air flow capacity may be configured by simply varying the numbers for rows of blades in the air flow path while otherwise utilizing identical components. Where the compressors are embodied in gas turbine engines as previously described, this enables production of a family of engines 18a, 18b, 18c of different output power rating and fuel consumption requirements simply by varying the blading in the compressor section.

While the gas turbine engines 18a, 18b and 18c may be of known construction apart from the compressors 11a, 11b, 11c, the coaction of the compressor sections with the other portions of the engines may best be understood by briefly reviewing certain basic structure of such engines. Referring specifically to FIG. 7A, for example, such engines 18a have a fuel burning combustor 24a receiving compressed air from compressor 11a through heat exchanger 26a. Output gases from the combuster 24a drive a gasifier turbine 42a that turns the impeller 12a of the compressor 11a. Nozzle vanes 43a direct the gas flow from combustor 24a and gasifier turbine 42a to a power turbine 44a which turns the engine output shaft 46a, the exhaust gas from the power turbine being discharged through the heat exchanger 26a to preheat the compressed air which is delivered to the combustor.

The modified compressor 11a of FIG. 7A is similar to that previously described with reference to FIG. 2 except that the first two compression-diffusion stages 30a, 30b have been eliminated by removing the first two rows 29a and 29b of compressor blades 28 and the first two rows 32a and 32b of diffuser blades 31. As a result of this simple modification, the compressor 11a of FIG. 7A has a lower air flow and a lower pressure ratio of about 4.5. The output power rating of the gas turbine engine 18a is then typically about 1200 horsepower realized with a fuel efficiency of less than about 0.4 brake specific fuel consumption (BSFC).

FIG. 7B illustrates a gas turbine engine 18b of substantially greater output power rating but which may be structurally identical to that of FIG. 7A except for another modification of the blading structure within the compressor 11b. Compressor 11b is similar to the compressor 11 of FIG. 2 except that the first and final rows 29a and 29g of compressor blades of FIG. 2 and the first and final two sets 32a, 32f, 32g of diffuser blades 31 have been eliminated. The pressure ratio achieved by the compressor 11b of FIG. 7B remains approximately the same as that of FIG. 7A but the volume of air passing through the compressor 11b of FIG. 7B and on to the combustor 24b is increased to the extent that the power output of the turbine engine 18b is now about 2,000 horsepower.

FIG. 7C depicts another modification, confined to the blading means 27c of the compressor, by which a similar basic gas turbine engine 18c including similar impeller 12c and stator member 13c elements in the compressor may be used to produce an engine of still higher rated output power. The compressor 11c of gas turbine engine 18c is identical to that of the first described embodiment of FIG. 2 except that the final row 29f of compressor blades of FIG. 2 have been removed and the final two rows 32f and 32g of diffuser blades are now situated more forwardly in the flow passage and configured for that changed location. This makes the pressure ratio of the compressor 11c of FIG. 7C about 6.5 and provides an increase of volumetric air flow relative to the FIG. 7B embodiment. The rated power output of the gas turbine engine 18c of FIG. 7C is typically about 3500 horsepower.

If the modifications of the compressor blading arrangements are accompanied by modifications of other components as well, the family of gas turbine engines may be extended to still higher output power ratings, examples of which are depicted in FIGS. 7D, 7E and 7F. Referring initially to FIG. 7D, by forming the impeller 12d and inner stator member 13d to be relatively elongated at the front end 16d, additional compression-diffusion stages, such as stage 30g may be provided at the air inlet end of the compressor 11d to further increase rated power output of the engine 18d. Thus the compressor 11d of FIG. 7D has an additional row of compressor blades 29g followed by an additional row 32h of diffuser blades at the front end of the air flow path 14d. The final two rows of compressor blades 29e and 29f of the embodiment of FIG. 2 and the intermediate flow of diffuser blades 32e have been removed. The final two rows of diffuser blades 32f and 32g are again situated more forwardly in the flow passage and have configurations appropriate to that portion of the passage. With these modifications, the pressure ratio of the modified compressor 11d of FIG. 7D remains at about 6.5 but air mass flow is sizably increased causing the rated power output of the gas turbine engine 18d to be increased to about 5,000 horsepower.

By making somewhat more extensive modifications, still greater power output ratings may be obtained. For example as depicted in FIG. 7E an auxiliary compressor section 47e may be added between the primary compressor 11e and the heat exchanger 26e. The auxiliary compressor section 47e may for example have two spaced apart rows 48e and 49e of compressor blades on an auxiliary impeller 50e each being followed by a row, 51e and 52e respectively of diffuser blades. An annular air duct 53e is provided to receive the output flow from the primary compressor section 11e and to return the flow radially inward for delivery to the air inlet end of the auxiliary compressor section 47e. Primary compressor section 11e is itself identical to the compressor 11d of the previous FIG. 7D. To best realize the advantages of the compressor modification of FIG. 7E, other elements of the gas turbine engine 18e are modified to the extent of providing an additional gasifier turbine stage 54e to drive the impeller 50e of the auxiliary compressor stage 47e. The modifications depicted in FIG. 7E produce an overall compressor pressure ratio of about 12 and raise the rated power output of the gas turbine engine 18e to about 5500 horsepower.

FIG. 7F illustrates still a further modification of the gas turbine engine 18f in which the structure remains similar to that described above with reference to FIG. 7E except that in the embodiment of FIG. 7F the annular air duct 53f which communicates the primary compressor section 11f with the auxiliary compressor section 47f includes an intercooler or heat exchanger 55f which acts to cool the compressed air in passage between the two compressor sections. Intercooling reduces the amount of power required to drive a compressor and this power reduction is reflected in an increased power output at the output shaft 46f of the gas turbine engine 18f. By this further modification, the gas turbine engine 18f is made to deliver about 6500 horsepower.

Referring now to FIG. 7G the power output and therefore the fuel consumption rate of any of the gas turbine engines described above may be adjusted downwardly as desired by disposing a row of air flow reducing stator vanes 56g in the inlet end of the air flow path 14g in front of the initial row 29g of compressor blades 28g. Stator blades 56g are angled relative to the air flow path 14g in order to constrict the air flow path and thereby reduce air mass flow to any desired extent.

As previously pointed out, the invention is not limited to compressors which function as an air intake component of gas turbine engines, but may also advantageously be utilized in free standing compressors for supplying compressed air to various pneumatic systems or to other mechanisms which include a compressor as one component. FIG. 8 illustrates an example of the latter category in which a compressor 11h embodying the invention constitutes an air intake component of a turbocharger 57 for an internal combustion engine 58.

A turbocharger 57 increases the fuel efficiency of the engine 58 by boosting intake manifold pressure and uses energy recovered from the exhaust gas of the engine for this purpose. More specifically, the turbocharger includes a turbine 59 driven by the engine exhaust flow and which drives the compressor 11h that supplies compressed air to the engine 58 intake manifold. Centrifugal compressors, preferably in combination with a centripetal turbine, are advantageous in turbochargers in view of the basic compactness and structural simplicity of such compressors but if a conventional single stage centrifugal compressor is used, the adiabatic efficiency of the turbocharger is undesirably limited. This adversely affects the power output of the associated engine 58 per unit of fuel consumed. Very high efficiency together with simplicity and compactness in both the axial and radial direction can be realized by embodying a multistage radial flow compressor 11h in accordance with the present invention in a turbocharger 57.

The compressor 11h and turbine 59 are secured to opposite ends of a housing 61 which journals a drive shaft 62 that defines the rotational axis of both the compressor and turbine.

Compressor 11h has an annular outer stator member 19h secured to the front end of housing 61 in coaxial relationship with the drive shaft 62 and which defines a broad air intake passage 64. Stator member 19h also forms a volute or annular collection chamber 66 which is communicated with intake manifold 67 of engine 58, the collection chamber being coaxial with intake passage 64 and being of greater diameter. A rotatable impeller 12h is supported on the forward end of drive shaft 62 within stator member 19h and in conjunction with an inner stator member 13h forms an annular air flow path 14h leading from air intake passage 64 to collection chamber 66. Impeller 12h and inner stator member 13h have configurations which cause the air flow path 14h to be of progressively increasing diameter in the direction of air flow while being of progressively diminishing thickness towards the air outlet end.

Multi-staged blading means 27h of the type previously described is situated within the flow path 14h to provide a plurality of subsonic internal compression-diffusion stages 30j, 30k, 30l, the blade rows of each stage having a calculated design point diffusion factor below about 0.55 and a de Haller number above about 0.70. In this example, the blading means 27h includes three spaced apart rows of compressor blades 28h secured to impeller 12h and alternated with three spaced apart rows of diffuser blades 31h secured to stator member 13h. Thus three compression-diffusion stages 30k, 30j, 30l are provided in this embodiment each being defined by a row of compressor blades 28h and the immediately following row of diffuser blades 31h.

While the multi-staged compressor 11h is advantageous in a turbocharger employing any of a variety of different types of turbine 59, very high efficiency is best realized by using a centripetal turbine 59 which is also of a multi-staged construction.

The turbine 59 of this example has an annular stator 76 secured to the back end of housing 61 and forming an exhaust gas outlet passage 77. A turbine rotor 78 is secured to the back end of drive shaft 62 in coaxial relationship with the shaft and in conjunction with an annular inner stator member 79 forms a gas flow path 81 which is of progressively less diameter but progressively increasing thickness from a gas inlet end 82 to a gas discharge end 83.

Stator 76 also forms an annular volute or gas receiving chamber 84 which is communicated with the inlet end 82 of gas flow path 81 and which is also communicated with the exhaust gas manifold 86 of engine 58. To cause the exhaust gas flow to drive the turbocharger 57, three spaced apart sets 87a, 87b, 87c of rotor vanes are secured to rotor 78 and extend into the flow path 81, the rotor vanes being angled with respect to the direction of gas flow. To maximize the reaction forces of the gas flow on the rotor vanes 87a, 87b and 87c, one of three rows 88a, 88b and 88c of stator vanes precedes each row of rotor vanes 87a, 87b and 87c respectively along the gas flow path. As the pressure drop at each individual row of rotor vanes 87a, 87b and 87c is substantially lower than the total pressure drop through the turbine 59 as a whole, each row of vanes operates at a relatively high efficiency in comparison with a single stage centripetal turbine having a single row of long rotor vanes.

The above described turbocharger 57 construction enables the impeller 12h and rotor 78 to be situated on the same shaft 62 to turn at the same speed and in most cases the two elements need not have any large disimilarity in diameters. With the rotational speeds and diameters of both the impeller 12h and rotor 78 closely matched, centrifugal stresses are also closely balanced at a high but tolerable level to optimize air and gas flow in relation to the size and weight of the turbocharger.

INDUSTRIAL APPLICABILITY

In the operation of the embodiment of the invention depicted in FIGS. 1 to 3, impeller 12 of the compressor 11 is turned by the gas turbine engine main shaft 18. The resulting rotary motion of the several rows 29a to 29f of compressor blades causes air to be drawn into inlet end 16 and to be forced along flow path 14 to the diffuser chamber 22 from which it is transmitted to the fuel combustor 24 of the engine 18 through tubulation 23 and heat exchanger module 26.

Air is compressed in stages during passage through flow path 14 as each row of compressor blades 29a to 29f imparts additional energy to the air flow. At each successive row 29a to 29f of compressor blades the added energy appears in part as a rise of static pressure, in part as tangential velocity energy of motion and to some extent as heat. The row 32a to 32g of diffuser blades 31 situated behind each row 29a to 29f of compressor blades converts a substantial portion of the velocity energy into additional static pressure. This process of compression followed by diffusion is repeated at each successive compression-diffusion stage 30a to 30f and since the pressure ratio at each successive stage is substantially less than the pressure ratio of the compressor as a whole, each individual stage operates at high efficiency and the overall compression process is therefore highly efficient.

Where the compressor 11 is an air intake component of a gas turbine engine 18 as in this example, the gains in efficiency in the operation of the compressor translate into increased efficiency of the gas turbine engine itself. To the extent that power losses in the compressor 11 are reduced, the deliverable power output of the gas turbine engine 18 is increased. Moreover the compressor 11 is very compact in both the axial and radial direction enabling the gas turbine engine 18 as a whole to also exhibit a very desirable degree of compactness.

Significant aspects of the operation of the compressors 11a to 11g of the gas turbine engines 18a to 18g of FIGS. 7A to 7G are essentially similar except insofar as different pressure ratios and air mass flows and therefore different output power ratings for the gas turbine engines are realized in the manner hereinbefore described.

In the operation of turbocharger 57 of FIG. 8, the exhaust gases from engine 58 drive turbine 59 which in turn drives the compressor 11k through drive shaft 62. The blading means 27h of the compressor 11k draws air into flow path 14h and delivers such air to the intake manifold 67 of the engine 58 through diffusion chamber 66. Again, the multiple staged blading means 27h of the compressor 11h enables the compression and diffusion process to be accomplished in stages each of which individually exhibits a small pressure ratio and low diffusion factor thereby providing for high efficiency in the operation of the compressor 11h and thus in the operation of the turbocharger 57 as a whole.

Other aspects, objects and advantages of this invention can be obtained from a study of the drawings, the disclosure and the appended claims.

I claim:

1. In a centrifugal compressor (11) having relatively rotatable inner (12) and outer (13) elements defining an annular flow path (14) therebetween, said flow path (14) including a substantially axially directed flow inlet end (16) and a flow outlet end (17) of greater diameter and a curved portion (20) between said flow inlet end (16) and said flow outlet end (17) that becomes progressively more radially directed as it approaches said flow outlet end (17), a series of compression-diffusion stages (30) in said flow path (14), each of said stages (30) including at least one of a series of compressor blade rows (29) and at least one of a series of diffuser blade rows (32), said compressor blade rows (29) being connected to one of said inner (12) and outer (13) elements and said diffuser blade rows (32) being alternated with said compressor blade rows (29) along said flow path (14) and being connected to the other of said inner (12) and outer (13) elements, each of said blade rows (29,32) having an inlet side (35i) and an outlet side (35o) located further along the flow path (14) than the inlet side (35i) the improvement comprising:

each blade row of all said compressor and diffuser blade rows of said compression-diffusion stages (30) being located in said curved portion (20) of said flow path (14) having a mean radius increase between the inlet side (35i) thereof and the outlet side (35o) thereof which is in the range of from about 2% to about 15%.

2. A compressor as set forth in claim 1 wherein said blade rows (29,32) of all of said compression-diffusion stage (30) have blade means (28,31) for providing a calculated design point diffusion factor below about 0.55 and a de Haller number greater than about 0.70.

3. A compressor as set forth in claim 1 further having at least one of said series of compression-diffusion stages (30) located in said substantially axially directed flow inlet end (16) of said flow path (14).

4. A compressor (12) as set forth in claim 1 wherein said flow outlet end (17) of said flow path (14) is directed substantially radially and further having at least one of said series of compression-diffusion stages (30) located in said radially directed flow outlet end (17).

5. A compressor as set forth in claim 1 further including vane means (56g) for restricting the rate of flow into said flow path (14) at said flow inlet end (16) thereof.

6. A compressor as defined in claim 1 in combination with a gas turbine engine (18) wherein said compressor (11) constitutes the air intake element of said gas turbine engine (18) and wherein one of said inner (12) and outer (13) elements is driven by said engine (18).

7. A compressor (11h) as set forth in claim 1 in combination with an engine turbocharger (57) turbine (59) wherein said compressor (11h) constitutes the air intake element of said turbo charger (57) and is driven by said turbine (59) thereof.

8. A centrifugal compressor (11) comprising:
an annular stator (13),
an impeller (12) positioned for rotation in said stator (13) and being radially spaced therefrom by an annular air flow path (14) which has an air inlet end (16) and an air outlet end (17) of larger diameter and which has a curved portion (20) of progressively increasing outward curvature which extends from said air inlet end (16) to said air outlet end (17),
a series of compressor blade rows (29) located in said curved portion (20) of said flow path (14) and being connected to said impeller (12) and a series of diffuser blade rows (32) located in said curved portion of said flow path and being connected to said stator (13), said diffuser blade rows (32) being alternated with said compressor blade rows (29) along said flow path (14), each of said compressor blade rows (29) in conjunction with an adjacent one of said diffuser blade rows (32) constituting one of a series of compression-diffusion stages (30) in said curved portion of said flow path (14), and
each of said blade rows (29,32) of all of said compression-diffusion stages (30) having blade means (28,31) for providing a calculated design point diffusion factor below about 0.55 and a de Haller number greater than about 0.70, and (32) having a mean radius which increases in the range of from about 2% to about 15% between the inlet side (35i) and the outlet side (35o) thereof.

* * * * *